3,308,084
AQUEOUS BRIGHT-DRYING DISPERSIONS OF POLYETHYLENE-POLYGLYCOL GRAFT CO-POLYMERS
Herbert Bestian, Frankfurt am Main, Helmut Korbanka, Hofheim, Taunus, and Joachim Lange, Neuenhain, Taunus, Germany, assignors to Farbwerke Hoechst Aktiengesellschaft Meister Lucius & Bruning, Frankfurt am Main-Hoechst, Germany, a company of Germany
No Drawing. Filed Oct. 8, 1963, Ser. No. 314,622
Claims priority, application Germany, Oct. 11, 1962, F 38,006
15 Claims. (Cl. 260—29.6)

The present invention relates to a process for making aqueous bright-drying dispersions.

It is known to polymerize ethylene in the presence of macromolecular polyethylene glycols. By grafting ethylene on to linear polymer ethers, solid compounds are obtained. It is also known that polyethylene telomers can be oxethylated to obtain polymers containing polyglycol groupings. These compounds can subsequently be dispersed. The preparation of such dispersions, starting from ethylene, requires, however, several reaction steps, i.e. preparation of the polyethylene telomer, oxethylation, and emulsification.

Now we have found that aqueous, bright-drying dispersions of graft polymers of ethylene grafted on to compounds having polyglycol groupings can be obtained by a single reaction step by polymerizing ethylene, if desired together with other ethylenically unsaturated polymerizable compounds, in an aqueous alkaline reaction medium under elevated pressure at temperatures above 50° C. in the presence of oxalkylated fat alcohols or oxalkylated fatty acids, while using water-soluble persulfates as free radical polymerization initiators.

For the graft polymerization, oxethylated fat alcohols or fatty acids that simultaneously have a good emulsifying action are advantageously used. Exemplary of such compounds are stearyl alcohol polyglycol ether, oleyl alcohol polyglycol ether, coconut-oil fat alcohol polyglycol ether, stearic acid polyglycol ester, oleic acid polyglycol ester, coconut-oil fatty acid polyglycol ester. The proportion of polyglycol contained in these compounds may vary within wide limits. Compounds having at least 5 ethylene oxide units, preferably 10 to 30 ethylene oxide units in the molecule are advantageously used. The oxethylated fat alcohols and fatty acids are used in the form of aqueous solutions. The amount of these substances should range from 1.5 to 20% by weight of the amount of water used. It is particularly advantageous to use these substances in an amount within the range of 4 to 12% by weight of the amount of water used and to prepare a dispersion having a solids content of 30 to 50% by weight. The polymerization may be carried out in batches or continuously.

If the process is carried out in batches, an aqueous solution of the oxethylated compound, if desired together with further additives, may be introduced into the reaction vessel before or in the course of the reaction. It is also possible to place only part of the solution in the reaction vessel at the beginning and to add the rest in the course of the reaction.

If the process is carried out continuously, an aqueous solution containing all the components necessary for the reaction may be introduced, if desired in partial streams, into the reaction vessel at different places. Alternatively, the solutions of the individual substances, for example the emulsifier solution or the catalyst solution, may be introduced separately into the reaction vessel.

As free radical polymerization initiators for the process of the invention, there are exclusively used water-soluble persulfates, for example sodium persulfate, potassium persulfate, ammonium persulfate or mixtures of these substances. The free radical polymerization initiator is used in an amount commonly used for such polymerizations, that is in an amount of about 0.2 to 10 grams per liter of water.

The reaction temperature shall be above 50° C., advantageously within the range of 70 and 150° C. High speeds of polymerization and polymerization products of particularly favorable properties are obtained by using temperatures within the range of 100 and 130° C.

In the process of the invention, the ethylene is polymerized under a pressure within the range of 250 and 850 atmospheres. By using pressures of up to about 300 atmospheres, dispersions are obtained which, after drying on a substratum, leave behind a waxy layer. Dispersions made under pressures above 300 atmospheres have the character of dispersions of plastics. Products of very favorable properties are obtained under pressures within the range of 300 to 800 atmospheres.

The graft polymerization is carried out in an alkaline medium. To obtain an alkaline pH range, alkali liquors such as sodium-, potassium-, lithium-, calcium- or barium hydroxide scolutions, alkali carbonate solutions or the corresponding buffer solutions may be used. It is particularly advantageous to use ammonia as the alkaline medium. Since the ammonia evaporates with the water when the dispersion dries up, a completely neutral film remains behind.

In addition to ethylene, one or more other ethylenically unsaturated compounds may be used in the graft polymerization. Exemplary of such ethylenically unsaturated compounds are vinyl esters, vinyl halides, acrylic acid esters, maleic acid esters, acrylamide, vinyl acrylamides. As far as these monomers are water-soluble, they may be introduced into the reaction vessel in the dissolved state either before the reaction is started or in the course of the reaction. Monomers that are insoluble in water or only water-soluble to a certain extent may be introduced into the reaction vessel either directly or after having been subjected to a preliminary emulsification. It is also possible to add protective colloids before or during the polymerization.

The dispersions obtained by the process of the invention are very stable and resistant to heat and cold. In spite of a high solid content (generally 30 to 50%), they have a low latex viscosity. They are free from substances that are usually added as creaming agents. When dispersions, which may be undiluted or diluted with water, are applied to a substratum they dry to yield bright films which have low dirt absorbing and dust binding power.

By precipitating the solid substances from the polyethylene dispersions obtained by the process of the invention, graft polymers are obtained which, after having been thoroughly washed, have an oxygen content of above 1% by weight, particularly 1.5 to 5% by weight. This corresponds to a polyglycol content of the graft polymer of at least 2.5% by weight, particularly 4 to 15% by weight.

The graft polymer dispersion may be used either alone or in combination with other emulsions, resin solutions or other additives. They may be used as bright-drying polish emulsions for polishing floors, as agents for coating paper or for textile treatment, as auxiliaries in the fields of leather and printing inks.

The following examples serve to illustrate the invention but they are not intended to limit it thereto.

*Example 1*

A solution of 80 grams of an oxethylated stearic acid having 18 ethylene oxide units in the molecule, 2 grams of potassium persulfate, and 4 cc. of 25% aqueous ammonia in 1 liter of water was introduced into an autoclave provided with a lifting magnetic stirrer. The autoclave was then scavenged with ethylene until it was free from air. Then 300 atmospheres of ethylene were introduced at a temperature within the range of 65 to 70° C. While stirring the contents of the autoclave continuously at that temperature, the pressure was maintained constant by introducing a further amount of ethylene. When the ethylene absorption decreased, a solution of 1.0 gram of potassium persulfate in 150 cc. of water was introduced under pressure into the reaction vessel, whereupon polymerization set in again. After 12 hours the autoclave was emptied. A dispersion of a solids content of 37% by weight and a latex viscosity of 72 centistokes (measured at 25° C.) was obtained which dried on a substratum while yielding a film having a high luster. The solid product which had been precipitated from the dispersion and washed until free from emulsifier had a density of 0.939, a reduced viscosity of 0.664 (determined on a 2% solution of the product in xylene at 85° C.) and a penetrometer number of $0.9 \cdot 10^{-1}$ mm. determined according to DIN specification No. 51,579. The oxygen content amounted to 3.5% by weight.

*Example 2*

A solution of 64 grams of an oxethylated stearyl alcohol having 18 ethylene oxide units in the molecule, 5 grams of polyvinyl pyrrolidone and 1 cc. of 25% aqueous ammonia in 500 cc. of water was introduced into an autoclave provided with a stirrer. After displacing the air with ethylene, 700 atmospheres of ethylene were introduced at a temperature of 120° C. A solution of 0.7 gram of potassium persulfate in 300 cc. of water was then introduced into the autoclave within 1.5 hours by a high pressure pump. Reaction set in immediately and was terminated after 2 hours. 1300 grams of a 43% dispersion having a pH value of 7.9 and a latex viscosity of 28 centistokes were obtained which dried on a substratum to yield a bright film. The solid product which had been precipitated from the dispersion and washed out had an oxygen content of 1.7% by weight. The reduced viscosity (determined on a 0.1% solution of the product in xylene at 85° C.) amounted to 1.02.

*Example 3*

A solution of 40 grams of an oxethylated stearyl alcohol in 350 cc. of water was introduced into an autoclave together with 1 cc. of a 25% aqueous ammonia solution and 150 grams of vinyl acetate. At a temperature of 85° C. and an ethylene pressure of 600 atmospheres a solution of 0.8 gram of potassium persulfate in 300 cc. of water was introduced into the autoclave within 4 hours. After the polymerization had been terminated, 1150 grams of a dispersion of a solids content of 44%, a pH value of 7.2 and a latex viscosity of 15.5 centistokes was obtained. It dried on a substratum to yield a film of high luster.

*Example 4*

A solution containing 130 grams of an oxethylated stearyl alcohol having 18 ethylene oxide units in the molecule, 2 cc. of 25% aqueous ammonia and 10 grams of polyvinyl pyrrolidone per liter of water, was continuously introduced by a high pressure pump at a rate of 500 cc. per hour into a 2-liter high pressure autoclave provided with a magnetic stirrer. Simultaneously, a solution containing 3.0 grams of potassium persulfate per liter of water was continuously introduced into the autoclave by a second pump at a rate of 300 cc. per hour. In the autoclave an ethylene pressure within the range of 600 and 700 atmospheres was maintained at a temperature of 130° C. Through an ascending pipe, about 1300 grams per hour of a dispersion having a solids content of 40% by weight, a latex viscosity of 12.7 centistokes (at 25° C.) and a pH value of 9.6 were removed continuously.

We claim:
1. A process for the manufacture of an aqueous bright-drying dispersion consisting essentially of 30 percent to 50 percent by weight of a graft polymer of ethylene on a compound having polyglycol groups in the molecule, which comprises polymerizing ethylene, in an aqueous alkaline medium at a temperature in the range of 50–160° C. and a pressure in the range of 250 to 850 atmospheres in the presence of about 0.2 to 10 grams per liter of a water-soluble persulfate, with 1.5 to 20 percent by weight, calculated on the quantity of aqueous medium, of a polyglycol having from 10 to 30 ethylene oxide groups per molecule, said polyglycol being selected from the group consisting of stearyl alcohol polyglycol ethers, oleyl alcohol polyglycol ethers, coconut-oil fat alcohol polyglycol ethers, stearic acid polyglycol esters, oleic acid polyglycol esters, and coconut-oil fatty acid polyglycol esters.

2. A process for the manufacture of an aqueous bright-drying dispersion consisting essentially of 30 percent to 50 percent by weight of a graft polymer of ethylene on a compound having polyglycol groups in the molecule, which comprises copolymerizing ethylene and another ethylenically unsaturated polymerizable compound selected from the group consisting of vinyl esters, vinyl halides, acrylic acid esters, maleic acid esters, acrylamide, vinyl acrylamide and combinations thereof in an aqueous alkaline medium at a temperature in the range of 50 to 160° C. and a pressure in the range of 250 to 850 atmospheres in the presence of about 0.2 to 10 grams per liter of a water-soluble persulfate, with 1.5 to 20 percent by weight, calculated on the quantity of aqueous medium, of a polyglycol having from 10 to 30 ethylene oxide groups per molecule, said polyglycol being selected from the group consisting of stearyl alcohol polyglycol ethers, oleyl alcohol polyglycol ethers, coconut-oil fat alcohol polyglycol ethers, stearic acid polyglycol esters, oleic acid polyglycol esters, and coconut-oil fatty acid polyglycol esters.

3. A process according to claim 1, wherein the polymerization is carried out at a temperature in the range of 70 to 150° C.

4. A process according to claim 2, wherein the polymerization is carried out at a temperature in the range of 70 to 150° C.

5. A process according to claim 1, wherein the polymerization is carried out at a pressure in the range of 300 to 800 atmospheres.

6. A process according to claim 2, wherein the polymerization is carried out at a pressure in the range of 300 to 800 atmospheres.

7. A process according to the claim 2, wherein vinyl acetate is used as ethylenically unsaturated polymerizable compound.

8. A process as defined in claim 1, wherein the amount of polyglycol, calculated on the quantity of aqueous medium, is 4 to 12 percent by weight.

9. A polymer dispersion having a solids content of 30 to 50% by weight of polyethylene-polyglycol graft copolymer, said copolymer containing at least 2.5% by weight polyglycol component and up to 97.5% by weight of polyethylene component, in which said polyglycol component contains from 10 to 30 ethylene oxide groups per molecule and is a member selected from the group consisting of stearyl alcohol polyglycol ethers, oleyl alcohol polyglycol ethers, coconut-oil fat alcohol polyglycol ethers, stearic acid polyglycol esters, oleic acid polyglycol esters, and coconut-oil fatty acid polyglycol esters.

10. A polymer dispersion having a solids content of 30 to 50% by weight of polyethylene-polyglycol graft copolymer containing 4 to 15% by weight polyglycol component and 96 to 85% by weight of polyethylene component, in which the polyglycol component contains from 10 to 30 ethylene oxide units per molecule and is a member selected from the group consisting of stearyl alcohol polyglycol ethers, oleyl alcohol polyglycol ethers, coconut-oil fat alcohol polyglycol ethers, stearic acid polyglycol esters, oleic acid polyglycol esters and coconut-oil fatty acid polyglycol esters.

11. A polymer dispersion as defined in claim 10 in which the polyglycol component is an oxethylated stearic acid having 18 ethylene oxide units in the molecule.

12. A polymer dispersion as defined in claim 10 in which the polyglycol component is oxethylated stearyl alcohol having 18 ethylene oxide units in the molecule.

13. A polymer dispersion having a solids content of 30 to 50% by weight of polyethylene-polyglycol graft copolymer containing 4 to 15% by weight polyglycol component and 96 to 85% by weight of polyethylene and one or more other ethylenically unsaturated components selected from the group consisting of vinyl esters, vinyl halides, acrylic acid esters, maleic acid esters, acrylamide and vinyl acrylamide, said polyglycol component containing from 10 to 30 ethylene oxide units per molecule and being a member selected from the group consisting of stearyl alcohol polyglycol ethers, oleyl alcohol polyglycol ethers, coconut-oil fat alcohol polyglycol ethers, stearic acid polyglycol esters, oleic acid polyglycol esters and coconut-oil fatty acid polyglycol esters.

14. A polymer dispersion as defined in claim 13, in which the other ethylenically unsaturated component is polyvinylpyrrolidone and the polyglycol component is oxethylated stearyl alcohol.

15. A polymer dispersion as defined in claim 13, in which the other ethylenically unsaturated component is vinylacetate and the polyglycol component is an oxethylated stearyl alcohol.

References Cited by the Examiner
UNITED STATES PATENTS

| | | | |
|---|---|---|---|
| 2,462,390 | 2/1949 | Harmon | 260—29.6 |
| 2,592,526 | 4/1952 | Seed | 260—29.6 |
| 3,226,352 | 12/1965 | Helin et al. | 260—29.6 |

SAMUEL H. BLECH, *Primary Examiner.*

MURRAY TILLMAN, J. ZIEGLER,
*Assistant Examiners.*